United States Patent
Morooka et al.

(10) Patent No.: US 8,952,079 B2
(45) Date of Patent: Feb. 10, 2015

(54) SEMI-CURED PRODUCT, CURED PRODUCT AND METHOD OF MANUFACTURING THESE, OPTICAL COMPONENT, CURABLE RESIN COMPOSITION

(71) Applicant: FUJIFILM Corporation, Minato-ku (JP)

(72) Inventors: Naoyuki Morooka, Ashigarakami-gun (JP); Rie Okutsu, Ashigarakami-gun (JP); Tatsuhiko Obayashi, Ashigarakami-gun (JP); Hiroaki Mochizuki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/869,591

(22) Filed: Apr. 24, 2013

(65) Prior Publication Data

US 2013/0237630 A1 Sep. 12, 2013

Related U.S. Application Data

(63) Continuation of application No. PCT/JP2011/074421, filed on Oct. 24, 2011.

(30) Foreign Application Priority Data

Oct. 25, 2010 (JP) .................. 2010-238454
Jun. 3, 2011 (JP) .................. 2011-125542

(51) Int. Cl.
- C08F 20/22 (2006.01)
- B29D 11/00 (2006.01)
- C08F 2/46 (2006.01)
- C08G 61/04 (2006.01)
- C08F 222/10 (2006.01)
- G02B 1/04 (2006.01)

(52) U.S. Cl.
CPC ............ C08F 222/10 (2013.01); G02B 1/04 (2013.01)
USPC ............ 522/182; 522/178; 522/1; 520/1

(58) Field of Classification Search
CPC .......... C08F 222/10; G02B 1/04; C08L 33/10
USPC .................. 522/182, 178, 1; 520/1
See application file for complete search history.

(56) References Cited

U.S. PATENT DOCUMENTS

2011/0144279 A1 * 6/2011 Uchida et al. ............. 525/301

FOREIGN PATENT DOCUMENTS

| JP | 2002-12684 | A | 1/2002 |
| JP | 2003-286316 | A | 10/2003 |
| JP | 2006-299194 | | * 11/2006 |
| JP | 2009-126011 | A | 6/2009 |

OTHER PUBLICATIONS

Nodono et al, JP 2006-299194 Machine Translation, 2006.*
Elyashiv-Barad, Sharon et al, Copolymerization of Methyl Acrylate with Norbornene Derivatives by Atom Transfer Radical Polymerization, 2002, Macromolecules, 35, 7521-7526.*
English translation of International Preliminary Report on Patentability dated May 23, 2013 in PCT/JP2011/074421.
International Preliminary Report on Patentability mailed May 10, 2013 in PCT/JP2011/074421.
International Search Report dated Feb. 7, 2012 for PCT/JP2011/074421.
Chinese Office Action issued Apr. 21, 2014 in a corresponding Chinese Patent Application No. 201180050583.3.

* cited by examiner

Primary Examiner — Ling Choi
Assistant Examiner — Jessica E Whiteley
(74) Attorney, Agent, or Firm — Sughrue Mion, PLLC

(57) ABSTRACT

A heat-resistant cured product is efficiently produced by obtaining a semi-cured product where a curable resin composition containing a (meth)acrylate monomer, a non-conjugated vinylidene group-containing compound and a thermal radical-polymerization initiator is processed by at least one of photoirradiation and heating to give a semi-cured product having a complex viscosity of from $10^5$ to $10^8$ mPa·s at 25° C. and at a frequency of 10 Hz; and putting the semi-cured product in a forming die for pressure formation therein, and heating it therein for thermal polymerization to give a cured product.

9 Claims, No Drawings

SEMI-CURED PRODUCT, CURED PRODUCT AND METHOD OF MANUFACTURING THESE, OPTICAL COMPONENT, CURABLE RESIN COMPOSITION

CROSS-REFERENCE TO RELATED APPLICATIONS

This application is a continuation application of International Application No. PCT/JP2011/074421, filed Oct. 24, 2011, which in turn claims the benefit of priority from Japanese Application No. 2010-238454, filed Oct. 25, 2010, and Japanese Application No. 2011-125542, filed Jun. 3, 2011, the disclosures of which Applications are incorporated by reference herein in their entirety.

BACKGROUND OF THE INVENTION

1. Field of the Invention

The present invention relates to a semi-cured product, a cured product and a method for producing these, and to an optical component and a curable resin composition.

2. Description of the Related Art

Heretofore, in general, inorganic glass materials have been used for optical components (also referred to as optical elements, mainly lenses) from the viewpoint that they are excellent in optical characteristics, mechanical strength, etc.

Recently desired is further improvement of production efficiency in a production system for image-taking devices through solder reflow treatment of optical modules with optical elements integrated therein in a state where those optical elements are mounted in addition to other electronic components on a circuit board.

Naturally, also in an optical module to be produced in the production system with reflow treatment incorporated therein, it is desired to use plastic optical elements capable of being produced at low cost rather than high-cost glass optical elements.

However, thermoplastic resins that have heretofore been used as resin materials for optical elements soften and melt at relatively low temperatures and therefore have good workability, but the optical elements molded from them are defective in that they readily deform by heat. In a case where electronic components with optical elements incorporated therein are mounted on a substrate in a solder reflow process, the optical elements themselves are also exposed to heating conditions, for example, at 270° C. or so; but in such a case, optical elements formed of a thermoplastic resin having poor heat resistance would be problematic as causing deformation or shape degradation. Given the situation, it is desired to impart heat resistance enough for reflow treatment to plastic optical components and to arrange them on a substrate simultaneously with other electronic elements thereon to thereby reduce the production cost.

Regarding the above, there is known a method of using a photocurable resin as the plastic material for optical elements for use in image-taking devices to be produced according to a reflow process (for example, see PATENT DOCUMENT 1). In general, a photocurable resin is, before cured, liquid or flowable and has good workability like a thermoplastic resin, but after cured, it does not exhibit flowability like that of a thermoplastic resin and therefore deforms little by heat. However, since the viscosity thereof before cured is low, a photocurable resin has a problem in that it leaks out through the parting line of a mold during molding therein and the leaked resin also cures to form an unnecessary part during molding. The leaked resin forms a thin film of a so-called burr and forms other rod-shaped, spherical or horn-like projections, but in this description, these are all collectively referred to as "burrs".

For suppressing mold clearance leakage so as to prevent burr formation during molding, PATENT DOCUMENT 1 proposes a production method that comprises semi-curing a curable composition through UV irradiation to form a semi-cured product (gummy product) and pressing and thermally curing it in a mold. Concretely, the patent reference discloses in the section of Examples therein, a case where a curable resin composition comprising a 2-alkyl-2-adamantyl(meth)acrylate as a curable resin and an ordinary thickener, sodium polyacrylate (or sulfonic acid copolymer), and a photopolymerization initiator and a thermal polymerization initiator added thereto is thickened through photoirradiation and then cured under heat to reduce burr formation during molding.

On the other hand, there is known a method of adding various additives to a photocurable resin composition to change the properties of the composition after cured. For example, PATENT DOCUMENT 2 discloses an embodiment of using a curable resin composition prepared by adding to an acrylic resin, from 0.5 to 30 parts by mass of a monofunctional acryl, a difunctional acryl or a terpene compound, and a photopolymerization initiator, as a coating resin composition and a COP-protective coating material for molded articles of an alicyclic structure-containing polymer (COP). The patent reference discloses use of a resin prepared by polymerizing a terpene compound for enhancing adhesiveness to COP. However, in the patent reference, there is given no description to suggest use of a thermal polymerization initiator, and the above-mentioned composition could not be used for heat-resistant lenses directly usable in a reflow process.

PATENT DOCUMENT 3 discloses in Example 6 therein a case of adding an alicyclic radical-polymerizing group-containing compound (A), a photopolymerization initiator and a thermal polymerization initiator (B) and a difunctional radical-polymerizing compound (A') and photopolymerizing and thermally-polymerizing them in that order. The patent reference discloses the ability to solve the problem of microfabrication with the curable resin composition having the constitution as above. However, from the viewpoint of application to optical components such as heat-resistant lenses, the disclosed composition is still unsatisfactory in point of the fabricability thereof.

CITATION LIST

PATENT DOCUMENT 1: JP-A 2009-126011
PATENT DOCUMENT 2: JP-A 2002-12684
PATENT DOCUMENT 3: JP-A 2003-286316

SUMMARY OF INVENTION

[Technical Problem]

The present inventors investigated the method described in PATENT DOCUMENT 1 as a method for producing a (meth)acrylate curable resin that has enhanced heat resistance. In [0074] in the patent reference, it is said that "suitable" viscosity after UV irradiation is from 600 to 3000 cP ($6 \times 10^2$ mPa·s to $3 \times 10^3$ mPa·s), and "high, gelling" viscosity is not lower than 10000 cP (not lower than $1 \times 10^4$ mPa·s). In [Table 1] to [Table 4] in Examples in the patent reference, the cases having "high, or gelling" viscosity after UV irradiation are not moldable in moldability evaluation, or that is, the resin composition gelled and could not be charged in a mold so that the resin composition could not be molded. On the other hand, the cases having "suitable" viscosity after UV irradiation could prevent burr formation during molding. However, the present inventors investigated the cases having "suitable" viscosity after UV irradiation, and found that these are difficult to control the formability of the semi-cured product and still unsatisfactory in point of the capability of preventing burr formation during molding, and in addition, after molded, many molded products cracked or wrinkled (or that is, the good rate of molded products was low), and well-transferred lenses could not be obtained.

The present invention is to solve the above-mentioned problems. Specifically, the technical problem of the invention is to provide a method for producing a cured product having a high heat resistance to such a degree that the product is usable in a reflow process, in which the burr formation during molding is prevented and the good rate after molding is high, by controlling the formability of the semi-cured product.

[Solution to Problem]

The present inventors have assiduously studied and, as a result, have found that, when a specific non-conjugated vinylidene group-containing compound is incorporated and when the complex viscosity of the semi-cured product to be obtained after UV irradiation and/or heating is controlled to fall within a specific range, then surprisingly a curable resin that is excellent in semi-cured state controllability though in a gelled stage and is excellent in heat resistance after having been processed in the subsequent thermal polymerization step can be obtained. Not adhering to any theory, the present invention can control the three-dimensional structure through chain transfer during polymerization of a non-conjugated vinylidene group-containing compound monomer to thereby provide the formability of the semi-cured product and the heat resistance necessary for optical components to a degree usable in a reflow process, and can solve the above-mentioned problems. Specifically, the present inventors have found that the above-mentioned problems can be solved by the following constitution, and have completed the present invention.

[1] A method for producing a cured product, comprising:
a step of obtaining a semi-cured product where a curable resin composition containing a (meth)acrylate monomer, a non-conjugated vinylidene group-containing compound and a thermal radical-polymerization initiator is processed by at least one of photoirradiation and heating to give a semi-cured product having a complex viscosity of from $10^5$ to $10^8$ mPa·s at 25° C. and at a frequency of 10 Hz, and
a thermal polymerization step of putting the semi-cured product in a forming die for pressure formation therein, and heating it therein for thermal polymerization to give a cured product,
wherein the non-conjugated vinylidene group-containing compound does not contain a (meth)acrylate monomer, and when the step of obtaining a semi-cured product includes a step of photo-irradiating the curable resin composition, the radical polymerization initiator further contains a photoradical polymerization initiator.

[2] The method for producing a cured product according to [1], wherein the step of obtaining a semi-cured product is a step of obtaining a semi-cured product having a complex viscosity of from $10^5$ to $10^8$ mPa·s at 25° C. and at a frequency of 10 Hz, by photoirradiating the curable resin composition containing a (meth)acrylate monomer, a non-conjugated vinylidene group-containing compound, a photoradical polymerization initiator and a thermal radical-polymerization initiator, but wherein the non-conjugated vinylidene group-containing compound does not contain a (meth)acrylate monomer.

[3] The method for producing a cured product according to [1] or [2], wherein in the thermal polymerization step to give the cured product, a mold is used as the forming die.

[4] The method for producing a cured product according to any one of [1] to [3], wherein the non-conjugated vinylidene group-containing compound is represented by the following general formula (1):

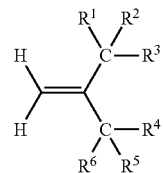

General Formula (1)

(In the general formula (1), $R^1$ to $R^6$ each independently represent a substituent. At least one of $R^1$ to $R^6$ forms a ring, or at least two bond to each other to form a ring.)

[5] The method for producing a cured product according to any one of [1] to [3], wherein the non-conjugated vinylidene group-containing compound is represented by the following general formula (2):

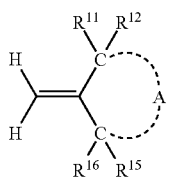

General Formula (2)

(In the general formula (2), $R^{11}$, $R^{12}$, $R^{15}$ and $R^{16}$ each independently represent a substituent, A represents an atomic group necessary for forming a cyclic structure.)

[6] The method for producing a cured product according to [5], wherein in the general formula (2), $R^{11}$, $R^{12}$, $R^{15}$ and $R^{16}$ each independently represent a substituent composed of hydrogen atoms and carbon atoms alone, and A is an alicyclic (non-aromatic hydrocarbon) structure.

[7] The method for producing a cured product according to anyone of [1] to [6], wherein the non-conjugated vinylidene group-containing compound has an alkenyl group in addition to the vinylidene group therein.

[8] The method for producing a cured product according to any one of [1] to [7], wherein the (meth)acrylate monomer is a polyfunctional (meth)acrylate monomer, or a mixture of a polyfunctional (meth)acrylate monomer and a monofunctional (meth)acrylate monomer.

[9] The method for producing a cured product according to any one of [1] to [8], wherein the (meth)acrylate monomer contains a (meth)acrylate monomer having an alicyclic structure.

[10] The method for producing a cured product according to any one of [1] to [9], wherein the curable resin composition contains the non-conjugated vinylidene group-containing compound in an amount of from 0.5 to 30% by mass relative to the curable resin composition.

[11] The method for producing a cured product according to any one of [1] to [10], wherein the (meth)acrylate monomer comprises a polyfunctional (meth)acrylate monomer and a monofunctional (meth)acrylate monomer, and contains the polyfunctional (meth)acrylate monomer in an amount of from 30 to 90% by mass relative to the total amount of the polyfunctional (meth)acrylate monomer and the monofunctional (meth)acrylate monomer.

[12] The method for producing a cured product according to any one of [1] to [11], further containing a polymer having a non-conjugated vinyl group in the side chain thereof.

[13] The method for producing a cured product according to any one of [1] to [11], wherein the curable resin composition contains the polymer having a non-conjugated vinyl group in the side chain thereof, in an amount of from 5 to 50% by mass of the total amount of the composition.

[14] A cured product produced according to the cured product production method of any one of [1] to [13].

[15] The cured product according to [14], of which the refractive index at a wavelength of 589 nm is at least 1.45, the Abbe's number is at least 45, and the light transmittance through a thickness of 1 mm at a wavelength of 589 nm is at least 75%.

[16] An optical component using the cured product of [14] or [15].

[17] A curable resin composition containing a (meth)acrylate monomer, a non-conjugated vinylidene group-containing compound represented by the following general formula (2), and a thermal radical-polymerization initiator, wherein the non-conjugated vinylidene group-containing compound does not contain a (meth)acrylate monomer:

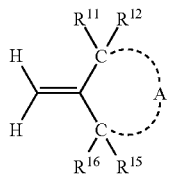

General Formula (2)

(In the general formula (2), $R^{11}$, $R^{12}$, $R^{15}$ and $R^{16}$ each independently represent a substituent, A represents an atomic group necessary for forming a cyclic structure.)

[18] The curable resin composition according to [17], which contains a photoradical polymerization initiator.

[19] A curable resin composition containing a (meth)acrylate monomer, a non-conjugated vinylidene group-containing compound represented by the following general formula (1), a polymer having a non-conjugated vinyl group in the side chain thereof, and at least one of a thermal radical-polymerization initiator and a photoradical polymerization initiator, wherein the non-conjugated vinylidene group-containing compound does not contain a (meth)acrylate monomer:

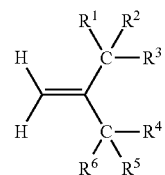

General Formula (1)

(In the general formula (1), $R^1$ to $R^6$ each independently represent a substituent. At least one of $R^1$ to $R^6$ forms a ring, or at least two bond to each other to form a ring.)

[20] The curable resin composition according to [19], which contains a thermal radical-polymerization initiator and a photoradical polymerization initiator, and wherein the non-conjugated vinylidene group-containing compound does not contain a (meth)acrylate monomer.

[21] A method for producing a semi-cured product having a complex viscosity of from $10^5$ to $10^8$ mPa·s at 25° C. and at a frequency of 10 Hz, wherein a curable resin composition containing a (meth)acrylate monomer, a non-conjugated vinylidene group-containing compound and at least one of a thermal radical polymerization initiator and a photoradical polymerization initiator is processed by at least one of photoirradiation and heating, and wherein the non-conjugated vinylidene group-containing compound does not contain a (meth)acrylate monomer.

[22] The method for producing a semi-cured product according to [21], which includes a step of photoirradiating the curable resin composition and in which the curable resin composition contains a photoradical polymerization initiator.

[23] A method for producing a semi-cured product, including a step of obtaining a semi-cured product having a complex viscosity of from $10^5$ to $10^8$ mPa·s at 25° C. and at a frequency of 10 Hz, wherein a curable resin composition containing a (meth)acrylate monomer, a non-conjugated vinylidene group-containing compound and a thermal radical polymerization initiator is processed by at least one of photoirradiation and heating, and wherein the non-conjugated vinylidene group-containing compound does not contain a (meth)acrylate monomer, and when the method includes a step of photoirradiating the curable resin composition, the radical polymerization initiator further contains a photoradical polymerization initiator.

[24] The method for producing a semi-cured product according to [23], which includes a step of photoirradiating the curable resin composition and wherein the radical polymerization initiator is a photoradical polymerization initiator.

[25] A semi-cured product produced according to the semi-cured product production method of [23] or [24].

[Advantageous Effects of Invention]

According to the invention, there is provided a method for producing a cured product having a high heat resistance to such a degree that the product is usable in a reflow process, in which the burr formation during molding is prevented and the good rate after molding is increased by controlling the formability of the semi-cured product.

DESCRIPTION OF EMBODIMENTS

The semi-cured product and the cured product of the invention, and the method for producing these and the materials to be used in these are described in detail hereinunder.

The description of the constitutive elements of the invention given hereinunder is for some typical embodiments of the invention, to which, however, the invention should not be limited. In this description, the numerical range expressed by the wording "a number to another number" means the range that falls between the former number indicating the lower limit of the range and the latter number indicating the upper limit thereof.

[Curable Resin Composition]

The curable resin composition to be used in the semi-cured production method of the invention and also in the cured product production method of the invention is characterized by containing a (meth)acrylate monomer, a non-conjugated vinylidene group-containing compound represented by the following general formula (1), and a thermal radical polymerization initiator, in which, however, the non-conjugated vinylidene group-containing compound does not contain a (meth)acrylate monomer.

General Formula (1)

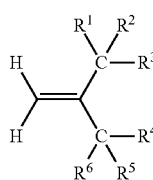

(In the general formula (1), $R^1$ to $R^6$ each independently represent a substituent. At least one of $R^1$ to $R^6$ forms a ring, or at least two bond to each other to form a ring.)

Among the above in the invention, the inventors have found that use of the curable resin composition of the first embodiment mentioned below further improves the heat resistance of the cured product after thermal curing (that is, the Young's modulus of the cured product at 270° C.).

Specifically, the first embodiment of the curable resin composition of the invention is characterized by containing a (meth)acrylate monomer, a non-conjugated vinylidene group-containing compound represented by the following general formula (2), and a thermal radical polymerization initiator (in which, however, the non-conjugated vinylidene group-containing compound does not contain a (meth)acrylate monomer).

General Formula (2)

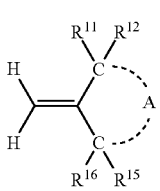

(In the general formula (2), $R^{11}$, $R^{12}$, $R^{15}$ and $R^{16}$ each independently represent a substituent, A represents an atomic group necessary for forming a cyclic structure.)

The inventors have further found that, when a curable resin composition of the second embodiment mentioned below is used in the invention and when the curable resin composition is directly introduced into a forming die and then photoirradiated and/or heated therein in the production method for a semi-cured product of the invention, and thereafter the semi-cured product is then directly thermally polymerized according to the method for producing a cured product of the invention, then the curable resin composition can be more successfully prevented from being leaked through the die clearance. As the case may be, the curable resin composition of the second embodiment that contains a photoradical polymerization initiator alone may be semi-cured and then photo-cured, and in such a case, one type alone of a photoradical polymerization initiator or two or more different types of photoradical polymerization initiators that differ in point of the absorption wavelength may be used.

Specifically, the curable resin composition of the second embodiment of the invention is a curable resin composition containing a (meth)acrylate monomer, a non-conjugated vinylidene group-containing compound represented by the above-mentioned general formula (1), a polymer having a non-conjugated vinyl group in the side chain thereof, and at least one of a thermal radical polymerization initiator and a photoradical polymerization initiator, in which, however, the non-conjugated vinylidene group-containing compound does not contain a (meth)acrylate monomer.

The production method for a semi-cured product of the invention and the production method for a cured product of the invention are described below with reference to preferred embodiments thereof. The production method for a cured product of the invention includes the production method for a semi-cured product of the invention, and therefore the preferred embodiments of the production method common to the two are described in the section of the production method for a semi-cured product of the invention.

[Production Method for Semi-Cured Product]

The method for producing a semi-cured product of the invention includes a step of obtaining a semi-cured product having a complex viscosity of from $10^5$ to $10^8$ mPa·s at 25° C. and at a frequency of 10 Hz, wherein a curable resin composition containing a (meth)acrylate monomer, a non-conjugated vinylidene group-containing compound and a thermal radical polymerization initiator is processed by at least one of photoirradiation and heating, and wherein the non-conjugated vinylidene group-containing compound does not contain a (meth)acrylate monomer. In case where the method includes a step of photo-irradiating the curable resin composition, the radical polymerization initiator further includes a photoradical polymerization initiator.

In this description, "semi-cured product" is one produced by polymerizing a curable resin composition, which, however, is not completely solid but has some flowability. For example, a photo and/or thermal polymer of a curable resin composition in such a state that its complex viscosity is from $10^5$ to $10^8$ mPa·s at 25° C. and at a frequency of 10 Hz is a semi-cured product. Not specifically defining the invention, those of which the upper limit of the complex viscosity at 25° C. and at a frequency of 10 Hz is up to $1.0 \times 10^9$ mPa·s are considered to fall within a range of semi-cured products. On the other hand, "cured product" is one produced by polymerizing a curable resin composition and is completely solid.

The materials to be used in the production method for a semi-cured product of the invention and the method are described below.

<Non-Conjugated Vinylidene Group-Containing Compound>

In the production method for a semi-cured product of the invention, the curable resin composition contains a non-conjugated vinylidene group-containing compound.

However, the non-conjugated vinylidene group-containing compound does not contain a (meth)acrylate monomer.

Using the curable resin composition that contains such a non-conjugated vinylidene group-containing compound in the invention makes it possible to control the viscosity of the semi-cured product after photo or thermal polymerization to fall within a specific range and makes it possible to improve the heat resistance and the good rate of the cured product to be obtained through thermal polymerization of the semi-cured product according to the cured product production method of the invention to be mentioned hereinunder.

In the semi-cured product production method of the invention, preferably, the non-conjugated vinylidene group-containing compound is represented by the following general formula (1).

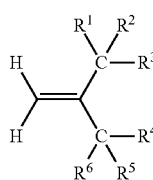

General Formula (1)

(In the general formula (1), $R^1$ to $R^6$ each independently represent a substituent. At least one of $R^1$ to $R^6$ forms a ring, or at least two bond to each other to form a ring.)

The substituent to be represented by $R^1$ to $R^6$ is not specifically defined, for which, for example, usable are the following substituents: a hydrogen atom, a halogen atom, a halogenoalkyl group, an alkyl group, an alkenyl group, an acyl group, a hydroxyl group, a hydroxyalkyl group, an aromatic group, a heteroaromatic group, an alicyclic group.

Of those, preferably, $R^1$ to $R^6$ each are independently a substituent composed of hydrogen, oxygen and carbon atoms alone, more preferably a substituent composed of hydrogen and carbon atoms alone. Concretely, $R^1$ to $R^6$ each are preferably a hydrogen atom, an alkyl group or an alkenyl group, more preferably a hydrogen atom, an alkyl group having from 1 to 5 carbon atoms, or an alkenyl group having from 2 to 5 carbon atoms.

Regarding the expression of the group (atomic group) in this description, the group with no expression of substitution or unsubstitution is meant to include both an unsubstituted group and a substituted group. For example, "alkyl group" includes not only an alkyl group with no substituent (unsubstituted alkyl group) but also an alkyl group with a substituent (substituted alkyl group).

The ring that any of $R^1$ to $R^6$ forms may be an aromatic ring or a heteroaromatic ring, and may also be a nonaromatic ring. Above all, the ring to be formed by $R^1$ to $R^6$ is preferably a nonaromatic ring, more preferably a nonaromatic hydrocarbon ring. The ring to be formed by $R^1$ to $R^6$ may have a substituent, and for example, the substituent is preferably an alkyl group having from 1 to 5 carbon atoms, more preferably a methyl group, an ethyl group, an n-propyl group or an isopropyl group. In case where the ring to be formed by $R^1$ to $R^6$ has substituents, the substituents may bond to each other to form a condensed ring.

The non-conjugated vinylidene group-containing compound may have one ring or multiple rings formed by $R^1$ to $R^6$ therein. In case where the compound has multiple rings formed by $R^1$ to $R^6$, the rings may be multiple rings independent of each other, or those independent multiple rings may be condensed to form a condensed ring, or in case where one ring has additional substituents, the substituents may bond to each other to form a condensed ring. Above all, the ring to be formed by $R^1$ to $R^6$ is more preferably a condensed ring formed through condensation of multiple rings; and in case where one ring has additional substituents, more preferably, the substituents bond to each other to form a condensed ring. In this description, an embodiment where two rings form spiro-condensation like the compound (B-2) mentioned below is also within the scope of the concept of the condensed ring here.

Preferably, the non-conjugated vinylidene group-containing compound contains a condensed ring formed through condensation of from 2 to 5 rings, more preferably a condensed ring formed through condensation of 2 or 3 rings.

Preferably, the number of the ring-constituting atoms of the condensed ring is from 3 to 10, more preferably from 3 to 9, even more preferably from 4 to 9.

Of $R^1$ to $R^6$, (A) at least one forms a ring, or (B) at least two bond to each other to form a ring. Of $R^1$ to $R^6$ in the non-conjugated vinylidene group-containing compound, preferred is the case (B) where at least two bond to each other to form a ring. More preferred embodiments of the non-conjugated vinylidene group-containing compound are described below, as divided in those two cases of (A) and (B).

First described is the case (A) where at least one of $R^1$ to $R^6$ forms a ring.

In the case (A), preferably, any two of $R^1$ to $R^3$ in those $R^1$ to $R^6$ bond to each other to form a ring, or any two of $R^4$ to $R^6$ bond to each other to form a ring. In this case, more preferably, any either alone of any two of $R^1$ to $R^3$ or any two of $R^4$ to $R^6$ bond to each other to form a ring, and in the case, more preferably, the others not bonding to each other and therefore not forming a ring of any two of $R^1$ to $R^3$ or any two of $R^4$ to $R^6$ bond are all hydrogen atoms (for example, in the case where any two of $R^1$ to $R^3$ bond to each other to form a ring, preferably, $R^4$ to $R^6$ are all hydrogen atoms).

Next, the case (B) where at least two of $R^1$ to $R^6$ bond to each other to form a ring is described.

In the case (B), preferably, the non-conjugated vinylidene group-containing compound is represented by the following general formula (2).

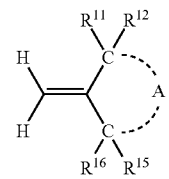

General Formula (2)

(In the general formula (2), $R^{11}$, $R^{12}$, $R^{15}$ and $R^{16}$ each independently represent a substituent, A represents an atomic group necessary for forming a cyclic structure.)

In the general formula (2), the preferred range of the substituent represented by $R^{11}$, $R^{12}$, $R^{15}$ and $R^{16}$ is the same as that by $R^1$ to $R^6$ mentioned above. $R^{11}$, $R^{12}$, $R^{15}$ and $R^{16}$ may bond to each other to form a ring, and the ring may have a substituent.

Of the carbon atom to which $R^{11}$ and $R^{12}$ bond, and the carbon atom to which $R^{15}$ and $R^{16}$ bond, one carbon atom is preferably an asymmetric carbon atom.

Also preferably, at least one of the two substituents in any one group alone of the group of $R^{11}$ and $R^{12}$ and the group of $R^{15}$ and $R^{16}$ is a hydrogen atom, and more preferably, both the two substituents in any one group alone are hydrogen atoms.

Preferably, the substituent is a hydrogen atom or a hydrocarbon group having from 1 to 5 carbon atoms, and the hydrocarbon group having from 1 to 5 carbon atoms does not form a ring. Also preferably, one along of $R^{11}$ and $R^{12}$ is a hydrogen atom or a hydrocarbon group having from 1 to 5 carbon atoms, and the hydrocarbon group having from 1 to 5 carbon atoms does not form a ring.

In the general formula (2), A represents an atomic group necessary for forming a cyclic structure, and the cyclic structure is not specifically defined and may be any known cyclic structure. The cyclic structure includes, for example, an alicyclic ring (nonaromatic hydrocarbon ring), an aromatic ring, a hetero ring, a lactone ring containing —CO—, etc.

Of those, preferably, A is an atomic group necessary form forming an alicyclic ring having from 4 to 10 carbon atoms including the carbon atoms bonding to A and the carbon atom constituting the non-conjugated vinylidene group, and more preferably, A is an atomic group necessary form forming an alicyclic ring having from 5 to 9 carbon atoms including the carbon atoms bonding to A and the carbon atom constituting the non-conjugated vinylidene group. The alicyclic ring may have a substituent, and the preferred embodiments of the substituent are the same as those of the substituent that the ring to be formed by R1 to R6 may have. A may be an unsaturated alicyclic ring or a saturated alicyclic ring, but preferably, the non-conjugated vinylidene group-containing compound has at least one unsaturated bond as a whole. A may form a condensed ring along with the substituent represented by $R^{11}$, $R^{12}$, $R^{15}$ and $R^{16}$.

In the general formula (2) in the invention, preferably, $R^{11}$, $R^{12}$, $R^{15}$ and $R^{16}$ each independently represent a substituent composed of hydrogen atoms and carbon atoms alone, and A represents an alicyclic (nonaromatic hydrocarbon) structure.

In the present invention, preferably, the non-conjugated vinylidene group-containing compound has any other alkenyl group in addition to the vinylidene group (non-conjugated vinylidene group). The position of the other vinylidene group than the non-conjugated vinylidene group in the non-conjugated vinylidene group-containing compound is not specifically defined. Preferably, however, the non-conjugated vinylidene group-containing compound has the other vinylidene group than the non-conjugated vinylidene group on the ring formed by $R^1$ to $R^6$. Specifically, the ring formed by $R^1$ to $R^6$ preferably includes at least one unsaturated hydrocarbon ring, and more preferably the ring includes at least one unsaturated hydrocarbon ring that has only one double bond.

Specific examples of the non-conjugated vinylidene group-containing compound preferably used in the invention are shown below, to which, however, the invention is not limited.

Non-Conjugated Vinylidene Group-Containing Compound

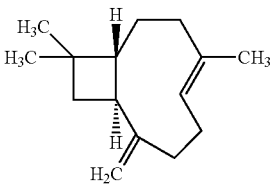

(B-1)

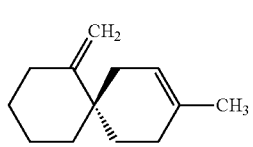

(B-2)

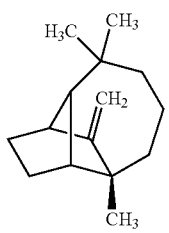

(B-3)

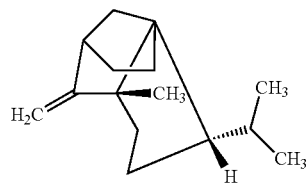

(B-4)

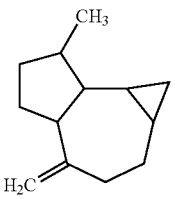

(B-5)

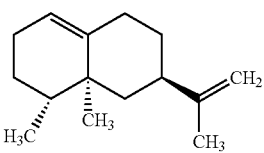

(B-6)

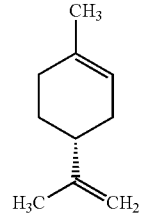

(B-7)

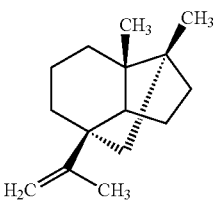

(B-8)

(Molecular Weight)

The molecular weight of the non-conjugated vinylidene group-containing compound is preferably from 100 to 400, more preferably from 120 to 350, even more preferably from 130 to 300.

(Method for Obtainment)

The method for obtaining the non-conjugated vinylidene group-containing compound is not specifically defined, and the compound may be commercially available or may be produced through synthesis.

In a case of commercially obtaining the compound, for example, β-caryophyllene (chemical formula: B-1) (by Tokyo Chemical Industry) is preferably used.

In a case of producing the compound through synthesis, the method for producing the non-conjugated vinylidene group-containing compound is not specifically defined and the compound may be produced in any known method. For example, of the non-conjugated vinylidene group-containing compound, the compound (B-1) preferred for use in the invention may be produced according to the method described in J. Am. Chem. Soc. 85, 362 (1964), Tetrahedron Lette., 24, 1885 (1983), etc.

In the production method for a semi-cured product of the invention, preferably, the curable resin composition contains the non-conjugated vinylidene group-containing compound in an amount of from 0.5 to 30% by mass relative to the total amount of the composition, more preferably from 1 to 25% by mass, even more preferably from 2 to 20% by mass.

<(Meth)Acrylate Monomer>

The production method for a semi-cured product of the invention uses a curable resin composition containing a (meth)acrylate monomer. In this description, "(meth)acrylate" expresses acrylate and methacrylate; "(meth)acryl" expresses acryl and methacryl; and "(meth)acryloyl" expresses acryloyl and methacryloyl. In this description, monomer is differentiated from oligomer and polymer and is a compound having a weight-average molecular weight of at most 1,000.

In the production method for a semi-cured product of the invention, preferably, the (meth)acrylate monomer contains a (meth)acrylate monomer having an alicyclic structure. Specifically, it is desirable that the (meth)acrylate monomer is represented by the following general formula (3) or (4).

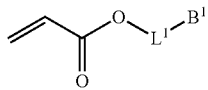

General Formula (3)

(In the general formula (3), $L^1$ represents a single bond or a divalent linking group; and $B^1$ represents a monovalent alicyclic group.)

$L^1$ is preferably a single bond or a divalent alkylene group, more preferably a single bond or a methylene group, even more preferably a single bond.

$B^1$ is preferably a monovalent alicyclic group having from 5 to 15 carbon atoms, more preferably a monovalent alicyclic group having from 7 to 15 carbon atoms, even more preferably a monovalent alicyclic group having from 8 to 12 carbon atoms. Preferably, $B^1$ is a condensed ring formed through condensation of at least two rings, more preferably a condensed ring formed through condensation of 2 or 3 rings. Preferably, $B^1$ does not have a double bond in the alicyclic structure.

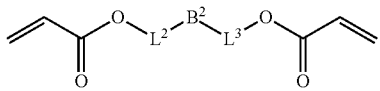

General Formula (4)

(In the general formula (4), $L^2$ and $L^3$ each independently represent a single bond or a divalent linking group; and $B^2$ represents a divalent alicyclic group.)

Preferably, $L^2$ and $L^3$ each independently represent a single bond or a divalent alkylene group, more preferably a single bond or a methylene group, even more preferably a methylene group.

Preferably, $B^2$ is a divalent alicyclic group having from to 15 carbon atoms, more preferably a divalent alicyclic group having from 7 to 15 carbon atoms, even more preferably a divalent alicyclic group having from 8 to 12 carbon atoms. Preferably, $B^1$ is a condensed ring formed through condensation of at least two rings, more preferably a condensed ring formed through condensation of 2 or 3 rings. Preferably, $B^2$ does not have a double bond in the alicyclic structure.

The (meth)acrylate monomer for use in the production method for a semi-cured product of the invention may be grouped into a polyfunctional (meth)acrylate monomer and a monofunctional (meth)acrylate monomer. The polyfunctional (meth)acrylate monomer is a (meth)acrylate monomer having multiple functional groups, and the monofunctional (meth)acrylate monomer is a (meth)acrylate monomer having one functional group. In this description, "functional group of (meth)acrylate monomer" means an ethylenic unsaturated bond that participates in polymerization.

(Polyfunctional (Meth)Acrylate Monomer)

The polyfunctional (meth)acrylate monomer for use in the invention includes, for example, the following: Tricyclodecanedimethanol di(meth)acrylate, diethylene glycol monoethyl ether(meth)acrylate, dimethyloldicyclopentane di(meth)acrylate, di(meth)acrylated isocyanurate, 1,3-butylene glycol di(meth)acrylate, 1,4-butanediol di(meth)acrylate, EO-modified 1,6-hexanediol di(meth)acrylate, ECH-modified 1,6-hexanediol di(meth)acrylate, allyloxypolyethylene glycol (meth)acrylate, 1,9-nonanediol di(meth)acrylate, EO-modified bisphenol A di(meth)acrylate, PO-modified bisphenol A di(meth)acrylate, modified bisphenol A dimethacrylate, EO-modified bisphenol F di(meth)acrylate, ECH-modified hexahydrophthalic acid di(meth)acrylate, hydroxypivalic acid neopentylglycol di(meth)acrylate, neopentylglycol di(meth)acrylate, EO-modified neopentylglycol di(meth)acrylate, propylene oxide (hereinafter referred to as "PO")-modified neopentylglycol di(meth)acrylate, stearic acid-modified pentaerythritol di(meth)acrylate, ECH-modified phthalic acid di(meth)acrylate, ECH-modified propylene glycol di(meth)acrylate, silicone di(meth)acrylate, triethylene glycol di(meth)acrylate, tetraethylene glycol di(meth)acrylate, dimethyloltricyclodecane di(meth)acrylate, neopentylglycol-modified trimethylolpropane di(meth)acrylate, tripropylene glycol di(meth)acrylate, EO-modified tripropylene glycol di(meth)acrylate, triglycerol di(meth)acrylate, dipropylene glycol di(meth)acrylate, ECH-modified glycerol tri(meth)acrylate, EO-modified glycerol tri(meth)acrylate, PO-modified glycerol tri(meth)acrylate, pentaerythritol tri (meth)acrylate, EO-modified phosphoric acid tri(meth)acrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl) isocyanurate, dipentaerythritol hexa(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri (meth)acrylate, ditrimethylolpropane tetra(meth)acrylate, pentaerythritol ethoxytetra(meth)acrylate, pentaerythritol tetra(meth)acrylate.

Of those, in the invention, preferred is use of a polyfunctional (meth)acrylate monomer having an alicyclic structure, and more preferred is use of a divalent (meth)acrylate monomer having an alicyclic structure. Even more preferred is tricyclodecanedimethanol di(meth)acrylate; and especially preferred is tricyclodecanedimethanol diacrylate.

(Monofunctional (Meth)Acrylate Monomer)

The monofunctional (meth)acrylate monomer for use in the invention include, for example, the following: Adamantyl (meth)acrylates such as 1-adamantyl(meth)acrylate, etc.; norbornyl(meth)acrylates such as isobornyl(meth)acrylate, etc.; tricyclodecane(meth)acrylates such as tricyclo[5,2,1,0$^{2,6}$]dec-8-yl acrylate, etc.; 2-ethyl-2-butylpropanediol (meth)acrylate, 2-ethylhexyl(meth)acrylate, 2-ethylhexylcarbitol(meth)acrylate, 2-hydroxybutyl(meth)acrylate, 2-hydroxyethyl(meth)acrylate, 2-hydroxypropyl(meth)acrylate, 2-methoxyethyl(meth)acrylate, 3-methoxybutyl(meth)acrylate, 4-hydroxybutyl(meth)acrylate, benzyl(meth)acrylate, 1- or 2-naphthyl(meth)acrylate, butanediol mono(meth)acrylate, butoxyethyl(meth)acrylate, butyl(meth)acrylate, cetyl(meth)acrylate, ethyleneoxide-modified (hereinafter referred to as "EO") cresol(meth)acrylate, dipropylene glycol (meth)acrylate, ethoxylated phenyl(meth)acrylate, ethyl (meth)acrylate, isoamyl(meth)acrylate, isobutyl(meth)acrylate, isooctyl(meth)acrylate, cyclohexyl(meth)acrylate, dicyclopentanyl(meth)acrylate, dicyclopentanyloxyethyl (meth)acrylate, isomyristyl(meth)acrylate, lauryl(meth)acrylate, methoxydipropylene glycol(meth)acrylate, methoxytripropylene glycol(meth)acrylate, methoxypolyethylene glycol(meth)acrylate, methoxytriethylene glycol(meth)acrylate, methyl(meth)acrylate, neopentyl glycol benzoate(meth)acrylate, nonylphenoxypolyethylene glycol(meth)acrylate, nonylphenoxypolypropylene glycol(meth)acrylate, octyl(meth)acrylate, paracumylphenoxyethylene glycol(meth)acrylate, epichlorohydrin (hereinafter referred to as "ECH")-modified phenoxy(meth)acrylate, phenoxyethyl(meth)acrylate, phenoxydiethylene glycol(meth)acrylate, phenoxyhexaethylene glycol(meth)acrylate, phenoxytetraethylene glycol(meth)acrylate, stearyl(meth)acrylate, EO-modified succinic acid(meth)acrylate, tert-butyl(meth)acrylate, tribromophenyl(meth)acrylate, EO-modified tribromophenyl(meth)acrylate, tridodecyl(meth)acrylate.

Of those, in the invention, preferred is use of a monofunctional (meth)acrylate monomer having an alicyclic structure. More preferred are 1-adamantyl(meth)acrylate, isobornyl(meth)acrylate and tricyclo[5,2,1,0$^{2,6}$]dec-8-yl(meth)acrylate; and even more preferred is 1-adamantyl methacrylate.

Preferably, in the production method for a semi-cured product of the invention, the (meth)acrylate monomer is a polyfunctional (meth)acrylate monomer, or a mixture of a polyfunctional (meth)acrylate monomer and a monofunctional (meth)acrylate monomer.

More preferably, the (meth)acrylate monomer is a mixture of a polyfunctional (meth)acrylate monomer and a monofunctional (meth)acrylate monomer from the viewpoint of enhancing the heat resistance of the cured product after thermal polymerization to be mentioned below.

Even more preferably, the polyfunctional (meth)acrylate monomer accounts for from 30 to 90% by mass relative to the total amount of the polyfunctional (meth)acrylate monomer and the monofunctional (meth)acrylate monomer, still more preferably from 40 to 90% by mass, further more preferably from 50 to 80% by mass.

Specific examples of the (meth)acrylate monomer preferred for use in the invention are given below, to which, however, the invention is not limited.

Polyfunctional (Meth)Acrylate Monomer

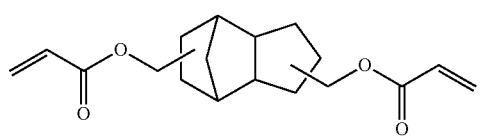
(Aa-1)

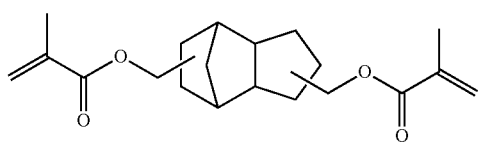
(Aa-2)

Monofunctional (Meth)Acrylate Monomer

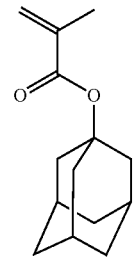
(Ab-1)

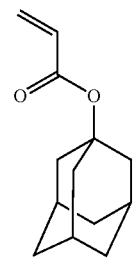
(Ab-2)

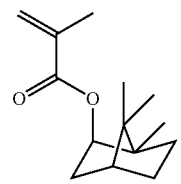
(Ab-3)

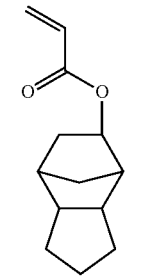
(Ab-4)

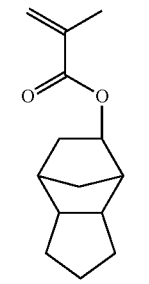
(Ab-5)

(Molecular Weight)

Preferably, the molecular weight of the (meth)acrylate monomer preferred for use in the invention is from 100 to 500, more preferably from 150 to 400, even more preferably from 200 to 400.

(Method for Obtainment)

The method for obtaining the (meth)acrylate monomer is not specifically defined, and the monomer may be commercially available or may be produced through synthesis.

In a case of commercially obtaining the monomer, for example, tricyclodexane-dimethanol diacrylate (chemical formula: Aa-1) (by Shin-Nakamura Chemical Industry) is preferably used.

In a case of producing the monomer through synthesis, the method for producing the (meth)acrylate monomer is not specifically defined and the monomer may be produced in any known method.

In the production method for a semi-cured product of the invention, preferably, the curable resin composition contains the (meth)acrylate monomer in an amount of from 50 to 95% by mass relative to the total amount of the composition, more preferably from 55 to 90% by mass, even more preferably from 60 to 90% by mass.

<Photoradical Polymerization Initiator>

In case where the production method for a semi-cured product of the invention is a production method for a semi-cured product through photoirradiation, the curable resin composition contains a photoradical polymerization initiator. Not specifically defined, the photoradical polymerization initiator may be any known photoradical polymerization initiator.

Concretely, the photoradical polymerization initiator includes the following compounds: Bis(2,6-dimethoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, bis(2,6-dichlorobenzoyl)-2,4,4-trimethylpentylphosphine oxide, 1-phenyl-2-hydroxy-2-methylpropan-1-one. 1-hydroxycyclohexyl phenyl ketone, 1-(4-isopropylphenyl)-2-hydroxy-2-methylpropan-1-one, 1,2-diphenylethane-dione, methylphenyl glyoxylate.

Of the above, BASF's Irgacure 184 (1-hydroxycyclohexyl phenyl ketone) is preferred for the photoradical polymerization initiator in the invention.

Not specifically defined, the amount of the photoradical polymerization initiator in the curable resin composition is preferably from 0.01 to 5% by mass relative to the total amount of the curable resin composition (preferably, the total of the (meth)acrylate monomer the non-conjugated vinylidene group-containing compound and the polymer having a non-conjugated vinyl group in the side chain thereof to be mentioned below), more preferably from 0.05 to 1.0% by mass, even more preferably from 0.05 to 0.5% by mass.

<Thermal Radical Polymerization Initiator>

In the production method for a semi-cured product of the invention, the curable resin composition contains a thermal radical polymerization initiator. Since such a thermal radical polymerization initiator is previously added to the curable resin composition, the semi-cured product produced in the invention efficiently gives a cured product having high heat resistance of the invention through the subsequent thermal polymerization, or that is, the semi-cured product gives the cured product with good moldability, with ease and with high productivity.

The thermal radical polymerization initiator concretely includes the following compounds: 1,1-di(t-hexylpentyloxy)cyclohexane, 1,1-di(t-butylperoxy)cyclohexane, 2,2-di(4,4-di-(t-butylperoxy)cyclohexyl)propane, t-hexylperoxy-isopropyl monocarbonate, t-butylperoxy 3,5,5-trimethylhexanoate, t-butylperoxy laurate, dicumyl peroxide, di-t-butyl peroxide, t-butylperoxy-2-ethylhexanoate, t-hexylperoxy-2-ethylhexanoate, cumene hydroperoxide, t-butyl hydroperoxide, 2,3-dimethyl-2,3-diphenylbutane.

Above all, in the invention, preferred is use of a hydroperoxide-type thermal radical polymerization initiator having a hydroperoxide group in the molecule, as the thermal radical polymerization initiator, and more preferred is use of at least one hydroperoxide-type thermal radical polymerization initiator having a hydroperoxide group in the molecule and at least one of a non-hydroperoxide-type thermal radical polymerization initiator not having a hydroperoxide group in the molecule.

Especially in the invention, NOF's Perbutyl O (t-butylperoxy 2-ethylhexanoate) is preferred as the non-hydroperoxide-type thermal radical polymerization initiator, and NOF's Percumyl H (cumene hydroperoxide) is preferred as the hydroperoxide-type thermal radical polymerization initiator.

The reason why use of the hydroperoxide-type thermal radical polymerization initiator having a hydroperoxide group in the molecule is preferred is because the hydroperoxide-type thermal radical polymerization has an effect of promoting chain transfer during polymerization of non-conjugated vinylidene group-containing compound monomer by which the three-dimensional structure of the resulting polymer can be more favorably controlled and the semi-cured product can be given good formability. In case where such a hydroperoxide-type thermal radical polymerization initiator is used, the temperature at which thermal radical polymerization is initiated is generally high, and therefore in such a case, it is more desirable that a non-hydroperoxide-type thermal radical polymerization initiator is used along with the hydroperoxide-type thermal radical polymerization initiator.

Not specifically defined, the amount of the thermal radical polymerization initiator to be in the curable resin composition is preferably from 0.01 to 5.0% by mass relative to the total of the (meth)acrylate monomer, the non-conjugated vinylidene group-containing compound and the polymer having a non-conjugated vinyl group in the side chain thereof to be mentioned below, more preferably from 0.1 to 4.0% by mass, even more preferably from 0.3 to 3.0% by mass.

<Polymer Having Non-Conjugated Vinyl Group in Side Chain>

In the production method for a semi-cured product of the invention, more preferably, the curable resin composition contains a polymer having a non-conjugated vinyl group in the side chain thereof, from the viewpoint that the viscosity of the curable resin composition before photoirradiation and/or heating can be controlled high so as to prevent the composition from being leaked away through the die clearance when the curable resin composition is directly set in a forming before photoirradiation and/or heating.

The polymer having a non-conjugated vinyl group in the side chain thereof may be a homopolymer or a copolymer. In the case of the copolymer, at least one copolymerization component may have a non-conjugated vinyl group in the side chain thereof.

Specific examples of the polymer having a non-conjugated vinyl group in the side chain thereof, which is preferred for use in the invention, are shown below, to which, however, the invention is not limited.

Polymer Having Non-Conjugated Vinyl Group in Side Chain

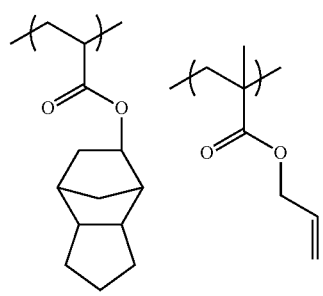

(E-1)

-continued

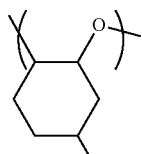
(E-2)

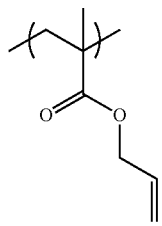
(E-3)

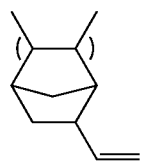
(E-4)

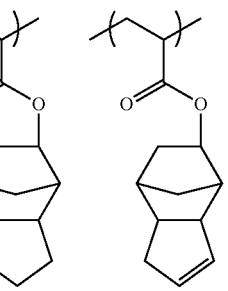
(E-5)

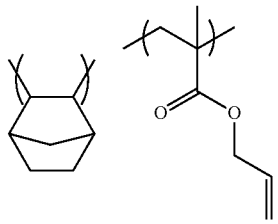
(E-6)

(Molecular Weight)

Preferably, the molecular weight of the polymer having a non-conjugated vinyl group in the side chain thereof is from 1000 to 10000000, more preferably from 5000 to 300000, even more preferably from 10000 to 200000.

(Tg)

The glass transition temperature (hereinafter this may be referred to as Tg) of the polymer having a non-conjugated vinyl group in the side chain thereof is preferably from 50 to 400° C., more preferably from 70 to 350° C., even more preferably from 100 to 300° C.

In the production method for a semi-cured product of the invention, preferably, the amount of the polymer having a non-conjugated vinyl group in the side chain thereof to be in the curable resin composition is from 0.1 to 50% by mass relative to the total amount of the composition (preferably the total amount of the (meth)acrylate monomer, the non-conjugated vinylidene group-containing compound, the photoradical polymerization initiator, the thermal radical polymerization initiator and the polymer having a non-conjugated vinyl group in the side chain thereof), more preferably from 5 to 45% by mass, even more preferably from 15 to 40% by mass. Also preferably, the amount of the polymer having a non-conjugated vinyl group in the side chain thereof in the curable resin composition is at most 50% by mass relative to the total amount of the composition, from the viewpoint of well controlling the initial viscosity of the curable resin composition before photoirradiation and/or heating to facilitate dispensation of the composition.

<Other Additives>

In the production method for a semi-cured product of the invention, the curable resin composition may contain additives such as resin not satisfying the requirement in the invention, monomer, dispersant, plasticizer, thermal stabilizer, lubricant and others not contradictory to the intent and the spirit of the invention.

<Semi-Curing Step>

The production method for a semi-cured product of the invention includes a step of processing the curable resin composition by photoirradiation and/or heating to give a semi-cured product having a complex viscosity of from $10^5$ to $10^8$ mPa·s at 25° C. and at a frequency of 10 Hz.

In the production method for a semi-cured product of the invention, the curable resin composition may be directly set in the forming die to be used in thermal polymerization in the production method for a cured product of the invention to be mentioned below, before photoirradiation and/or heating of the composition, or alternatively, the curable resin composition may be set in a die different from the forming die and processed therein by photoirradiation and/or heating to give a semi-cured product, and thereafter the thus-photoirradiated, semi-cured product obtained in the production method for a cured product of the invention to be mentioned below, may be moved into the forming die.

Here, the forming die is generally composed of two die parts and is so designed that the content therein could be heated under pressure by the combination of the two die parts. When a low-viscosity composition is injected onto the forming die of the type, then the composition may leak out through the die clearance. The curable resin composition to be used in the production method for a semi-cured product of the invention generally has a low viscosity and therefore it would be difficult to directly inject the composition into a forming die. Consequently, in one preferred embodiment of the production method for a semi-cured product of the invention, a polymer having a non-conjugated vinyl group in the side chain thereof is further added to the curable resin composition to control the viscosity of the composition, as described above, and the composition is injected into a forming die in which it is semi-cured through photoirradiation and/or heating therein and is additionally processed for thermal polymerization therein to give a cured product in one and the same mold. This embodiment is preferred here from the viewpoint of the productivity of the product.

On the other hand, according to another preferred embodiment of the production method for a semi-cured product of the invention, the curable resin composition is put into a die different from the forming die, and is photoirradiated and/or heated therein to give a semi-cured product, and thereafter the semi-cured product is transferred into the forming die for polymerization therein to give a cured product, and this embodiment is preferred from the viewpoint of reducing the material cost.

In case where a die different from a forming die is used, preferred is use of a die for preform. The die for preform may be formed of metal, or may be formed of glass or resin. In consideration of using the die repeatedly in a mass-production line, the die for preform is preferably formed of metal or glass. In case where the semi-cured product of the invention is used for lenses, it is desirable that at least one side of the die for preform has a shape that is the same as and/or similar to the shape of the forming die, and more preferably, both sides of the die have a shape that is the same as and/or similar to the shape of the forming die.

(Condition of Photoirradiation)

Preferred conditions of photoirradiation in the production method for a semi-cured product of the invention are described below.

Preferably, the photoirradiation is carried out so that the semi-cured product after photoirradiation could have a complex viscosity of from $10^5$ to $10^8$ mPa·s at 25° C. and at a frequency of 10 Hz, more preferably from $10^5$ to $10^{7.5}$ mPa·s, even more preferably from $10^{5.5}$ to $10^{7.5}$ mPa·s.

Preferably, the light for photoirradiation is UV ray or visible ray, more preferably UV ray. For example, favorably used are metal halide lamp, low-pressure mercury lamp, high-pressure mercury lamp, ultra-high-pressure mercury lamp, bactericidal lamp, xenon lamp, LED lamp, etc.

The atmosphere in photoirradiation is preferably in air or after purging with an inert gas; and more preferred is an atmosphere purged with nitrogen to have an oxygen concentration of at most 1%.

(Condition for Semi-Curing by Heating)

Preferred conditions for thermal semi-curing in the production method for a semi-cured product of the invention are described below.

Preferably, the thermal semi-curing is attained so that the semi-cured product after heating could have a complex viscosity of from $10^5$ to $10^8$ mPa·s at 25° C. and at a frequency of 10 Hz, more preferably from $10^5$ to $10^{7.5}$ mPa·s, even more preferably from $10^{5.5}$ to $10^{7.5}$ mPa·s.

[Semi-Cured Product]

The semi-cured product of the invention is one produced according to the semi-cured product production method of the invention. The semi-cured product is favorably used in the production method for a cured product of the invention to be mentioned below.

The semi-cured product of the invention is produced through polymerization of a composition containing a (meth)acrylate monomer and a non-conjugated vinylidene group-containing compound, and this has a complex viscosity of from $10^5$ to $10^8$ mPa·s at 25° C. and at a frequency of 10 Hz, and contains a thermal radical polymerization initiator (in this, however, the non-conjugated vinylidene group-containing compound does not contain a (meth)acrylate monomer). Here, the preferred range of the complex viscosity of the semi-cured product of the invention is the same as the preferred range of the complex viscosity of the semi-cured product in the semi-cured product production method of the invention mentioned above.

The semi-cured product of the invention may not contain the photoradical polymerization initiator at all after the photoirradiation step, since the initiator is completely consumed in the step, or the photoradical polymerization initiator may remain in the semi-cured product.

(Tg)

Preferably, the glass transition temperature (hereinafter this may be referred to as Tg) of the semi-cured product of the invention is preferably from −150 to 0° C., more preferably from −50 to 0° C., even more preferably from −20 to 0° C.

[Method for Forming Semi-Cured Product]

The invention also relates to a method for forming a semi-cured product.

The method for forming a semi-cured product of the invention comprises processing a curable resin composition containing a (meth)acrylate monomer and a non-conjugated vinylidene group-containing compound and at least one of a thermal radical polymerization initiator and a photoradical polymerization initiator, by at least one of photoirradiation and heating to form a semi-cured product having a complex viscosity of from $10^5$ to $10^8$ mPa·s at 25° C. and at a frequency of 10 Hz (in which, however, the non-conjugated vinylidene group-containing compound does not contain a (meth)acrylate monomer).

Having the constitution, the invention forms a semi-cured product having a suitable complex viscosity.

Preferably, the method for forming a semi-cured product of the invention includes a step of photoirradiating the curable resin composition and the curable resin composition contains a photoradical polymerization initiator.

[Production Method for Cured Product]

The method for producing a cured product of the invention comprises a step of obtaining a semi-cured product where a curable resin composition containing a (meth)acrylate monomer, a non-conjugated vinylidene group-containing compound and a thermal radical-polymerization initiator is processed by at least one of photoirradiation and heating to give a semi-cured product having a complex viscosity of from $10^5$ to $10^8$ mPa·s at 25° C. and at a frequency of 10 Hz (that is, the step of obtaining a semi-cured product according to the semi-cured product production method of the invention), and a thermal polymerization step of putting the semi-cured product in a forming die for pressure formation therein, and heating it therein for thermal polymerization to give a cured product, in which, however, the non-conjugated vinylidene group-containing compound does not contain a (meth)acrylate monomer, and when the step of obtaining a semi-cured product includes a step of photo-irradiating the curable resin composition, the radical polymerization initiator further contains a photoradical polymerization initiator.

Even in a case where the step of obtaining the semi-cured product does not include a step of photoirradiation of the curable resin composition, the radical polymerization initiator may further contain a photoradical polymerization initiator.

Preferably, the production method for a cured product of the invention includes a step of photoirradiating the curable resin composition and the radical polymerization initiator is a photoradical polymerization initiator.

<Thermal Polymerization Step>

The production method for a cured product of the invention includes a thermal polymerization step of putting the semi-cured product in a forming die for pressure formation therein, and heating it therein for thermal polymerization to give a cured product.

The forming die to be used in the production method for a cured product of the invention may be referred to also as a thermoforming die. In general, the thermoforming die is composed of two die parts and is preferably so designed that a content can be heated under pressure in the combination of the two die parts. In the production method for producing a cured product of the invention, preferably, a mold is used as the forming die in the thermal polymerization step to obtain a cured product. The thermoforming die of the type for use herein is described, for example, in JP-A 2009-126011, which is expressly incorporated herein by reference in its entirety.

(Introduction into Forming Die)

In the production method for a cured product of the invention, first, the semi-cured product produced according to the semi-cured product production method of the invention mentioned above, into a forming die. First described is the step of putting the semi-cured product into the forming die.

The semi-cured product after photoirradiation and/or heating is directly set in a thermoforming die and is photoirradiated and/or heated therein, or is set in a die different from a thermoforming die and is photoirradiated and/or heated therein, as described in the section of the semi-cured product production method of the invention. In the case where the semi-cured product after photoirradiation is directly set in a thermoforming die and is photoirradiated and/or heated therein, the operation of putting the semi-cured product into a thermoforming die is unnecessary, and the semi-cured product is written to be put in a forming die merely for explanation.

On the other hand, in the case where the semi-cured product after photoirradiation and/or heating is set in a die different from a thermoforming die and is photoirradiated and/or heated therein, the operation means the step of transferring the semi-cured product into a thermoforming die. For the method of transferring the semi-cured product after photoirradiation and/or heating into a thermoforming die, for example, usable is a vacuum tweezer system equipped with a syringe, a vacuum pad and a vacuum generator. The semi-cured product of the invention has a complex viscosity falling within a specific range, and therefore can be readily transferred into a thermoforming die by the use of such a vacuum tweezer system.

(Pressure Forming/Heating)

According to the production method for a cured product of the invention, the semi-cured product put in a forming die is formed under pressure and heated for polymerization to give a cured product.

Here, pressure forming and heating may be carried out simultaneously, or heating may be carried out after pressure forming, or pressure forming may be carried out after heating. Above all, preferably, pressure forming and heating are carried out simultaneously. Also preferably, after simultaneous pressure forming and heating, the product may be further heated at a higher temperature after the pressure given thereto has become stable.

The pressure for the pressure forming is preferably from 1 kg/cm² to 100 kg/cm², more preferably from 3 kg/cm² to 50 kg/cm², even more preferably from 3 kg/cm² to 30 kg/cm².

The heating temperature is preferably from 80 to 300° C. when the heating is carried out simultaneously with pressure forming, and is more preferably from 120 to 300° C., even more preferably from 150 to 280° C.

On the other hand, in the case where the product is further heated at a higher temperature after the pressure given thereto has become stable, the heating temperature is preferably from 80 to 300° C., more preferably from 120 to 300° C., even more preferably from 150 to 280° C.

The time of thermal polymerization is preferably from 30 to 1000 seconds, more preferably from 30 to 500 seconds, even more preferably from 60 to 300 seconds.

The atmosphere in thermal polymerization is preferably in air or after purging with an inert gas; and more preferred is an atmosphere purged with nitrogen to have an oxygen concentration of at most 1%.

[Cured Product]

The cured product of the invention is one produced according to the cured product production method of the invention. Preferred characteristics of the cured product of the invention are described below.

(270° C. Storage Elastic Modulus)

The cured product of the invention is characterized in that its 270° C. storage elastic modulus is high and its heat resistance is high. Having a high storage elastic modulus at 270° C., the cured product of the invention can be mounted on a substrate along with other ordinary electronic devices and can be fixed thereon in a reflow process, therefore significantly reducing the production cost of optical components-fitted electric appliances.

Preferably, the 270° C. storage elastic modulus of the cured product of the invention is from 0.1 to 30×10² MPa, more preferably from 1.0 to 30×10² MPa, even more preferably from 1.5 to 10×10² MPa. In the invention, the 270° C. storage elastic modulus of the cured product is determined under the condition of a tensile mode, a frequency of 10 Hz and a strain of 10 μm (constant), using Rheogel-E4000 (UBM's dynamic viscoelastometer).

(Refractive Index)

Preferably, the cured product of the invention has a high refractive index from the viewpoint of using it for optical components, especially for lenses. Preferably, the refractive index nD at a wavelength of 589 nm of the cured product of the invention is at least 1.45, more preferably at least 1.50, even more preferably at least 1.51.

(Abbe's Number)

Preferably, the cured product of the invention has a large Abbe's number from the viewpoint of reducing the chromatic aberration in using it for optical components, especially for lenses. Preferably, the Abbe's number at a wavelength of 589 nm of the cured product of the invention is at least 45, more preferably at least 50, even more preferably at least 55.

In this description, the Abbe's number vD is computed according to the following equation (A), in which nD, nF and nC each are a refractive index at a wavelength of 589 nm, 486 nm and 656 nm, respectively.

$$vD = \frac{nD - 1}{nF - nC} \qquad \text{equation (A)}$$

(Water Absorption)

Preferably, the water absorption of the cured product of the invention is small from the viewpoint of retarding the change of optical characteristics (refractive index, Abbe's number, and light transmittance) thereof and the dimensional change thereof owing to absorption of moisture in air. Preferably, the water absorption of the cured product of the invention is from 0.001 to 1.5%, more preferably from 0.001 to 1.2%, even more preferably from 0.001 to 1.0%. In the invention, the water absorption is determined according to the following equation, in which the weight (Wi) of the thermally-cured product is measured immediately after its production and the weight (Wf) thereof is measured after kept in an environment tester at 85° C. and at a relative humidity of 85% for 3 weeks.

$$\text{Water Absorption (\%)} = \frac{W_f - W_i}{W_i} \times 100$$

(Light Transmittance)

Preferably, the light transmittance through a thickness of 1 mm of the cured product of the invention at a wavelength of 589 nm is at least 75%, more preferably at least 80%, even more preferably at least 95%, from the viewpoint of use thereof for optical components. In the invention, the light transmittance through a thickness of 1 mm of the cured product is measured as follows: The cured product having a thickness of 1.0 mm is prepared, and its light transmittance is measured using a UV-visible light spectrometer (UV-3100, by Shimadzu).
(Tg)
Preferably, Tg of the cured product of the invention is from 150 to 400° C., more preferably from 180 to 300° C., even more preferably from 240 to 300° C.
(Size)
Preferably, the maximum thickness of the cured product of the invention is from 0.1 to 10 mm. The maximum thickness is more preferably from 0.1 to 5 mm, even more preferably from 0.15 to 3 mm. Also preferably, the maximum diameter of the cured product of the invention is from 1 to 1000 mm. The maximum diameter is more preferably from 2 to 50 mm, even more preferably from 2.5 to 10 mm. The cured product having the size as above is especially useful for optical components having a high refractive index. In general, it is not easy to produce such a thick molded article according to a solution casting method since the solvent is difficult to remove, or that is, forming the article is not easy. However, according to the semi-cured product production method and the cured product production method of the invention, it is easy to form such a thick molded article while preventing the generation of burrs, and therefore the good rate of the products is high. The invention therefore realizes cured products having complicated shapes such as non-spherical shapes, etc. To that effect, according to the invention, it is easy to produce cured products having high heat resistance.

[Optical Components]

Preferably, the cured product of the invention is a molded article having a high refractive index and a high light transmittance and lightweight and excellent in optical characteristics, and the optical component of the invention uses the cured product of the invention. The type of the optical component is not specifically defined. In particular, the cured product of the invention is favorably used for optical components that utilize the excellent optical characteristics of curable resin compositions, especially for light-transmissive optical components (so-called passive optical components). Optically-functional devices equipped with such optical components include, for example, various types of display devices (liquid-crystal displays, plasma displays, etc.), various types of projector devices (OHP, liquid-crystal projectors, etc.), optical fiber communication systems (light waveguides, light amplifiers, etc.), image-taking devices such as cameras, videos, etc.

The passive optical components for use in optically-functional devices include, for example, lenses, prisms, prism sheets, panels (tabular molded articles), films, optical waveguides (filmy, fiber-like, etc.), optical discs, LED sealants, etc. If desired, the passive optical components may have a multilayer structure, for example, by providing thereon a coating layer, such as a protective layer for preventing mechanical damage of the coating surface by friction or abrasion, a light-absorbing layer for absorbing the light having an undesirable wavelength to cause degradation of inorganic particles, substrates and others, a blocking layer for retarding or preventing permeation of reactive small molecules such as moisture, oxygen gas, etc., an antiglare layer, an antireflection layer, a low-refractivity layer, etc., as well as any other additional functional layer added thereto. Specific examples of the optional coating layers include a transparent conductive film and a gas-barrier layer formed of an inorganic oxide coating layer, a gas-barrier layer and a hard coat layer formed of an organic coating layer, etc. The coating method for these layers may be any known coating method such as a vacuum evaporation method, a CVD method, a sputtering method, a dip coating method, a spin coating method, etc.

The optical component using the cured product of the invention is especially favorable for lens substrates. The lens substrate produced according to the semi-cured product production method and the cured product production method of the invention favorably has a high Abbe's number and additionally has the advantages of high refractivity and light transmittance and is lightweight and is excellent in optical characteristics. By suitably selecting the type of the monomer to constitute the curable resin composition, it is possible to control in any desired manner the refractive index of the lens substrate.

In this description, "lens substrate" means a single component capable of exhibiting a lens function. On and around the surface of the lens substrate, any film and component may be provided in accordance with the service environment and the use of lenses. For example, on the surface of the lens substrate, there may be formed a protective film, an antireflection film, a hard coat film, etc. It is also possible to make the lens substrate intruded and fixed in a substrate holding frame. However, those films and frame are additional components to the lens substrate and therefore differ from the lens substrate itself referred to in the invention.

In using the lens substrate for lenses, the lens substrate itself may be used as a lens by itself, or additional films or frame may be added thereto for use as a lens, as mentioned above. The type and the shape of the lens using the lens substrate are not specifically defined. The lens substrate may be used, for example, for lenses for eye glasses, lenses for optical instruments, optoelectronics lenses, laser lenses, pickup lenses, lenses for car-mounted cameras, lenses for mobile cameras, lenses for digital cameras, OHP lenses, microlens arrays, wafer-level lens arrays (Japanese Patent 3926380, WO2008/102648, Japanese Patent 4226061, Japanese Patent 4226067), etc.

EXAMPLES

The characteristics of the invention are described more concretely with reference to the following Examples.

In the following Examples, the material used, its amount and ratio, the details of the treatment and the treatment process may be suitably modified or changed not overstepping the spirit and the scope of the invention. Accordingly, the invention should not be limitatively interpreted by the Examples mentioned below.

Example 1

Obtainment of Non-Conjugated Vinylidene Group-Containing Compound

A non-conjugated vinylidene group-containing compound B-1, Tokyo Chemical Industry's trade name β-Caryophyllene was used.

<Preparation of Curable Resin Composition>

60 parts by mass of the above-mentioned polyfunctional (meth)acrylic monomer (Aa-1) (Shin-Nakamura Chemical Industry's trade name: A-DCP), 30 parts by mass of the above-mentioned monofunctional (meth)acrylic monomer (Ab-1) (Osaka Organic Chemical Industry's trade name: ADMA), 10 parts by mass of the above-mentioned non-conjugated vinylidene group-containing compound B-1 (Tokyo Chemical Industry's trade name: β-Caryophyllene), 0.1 parts by mass of the following photoradical polymerization initiator F-1 (BASF's Irgacure 184), 1 part by mass of the following thermal radical polymerization initiator F-3 (NOF's Perbutyl O), and 0.5 parts by mass of the following thermal radical polymerization initiator F-4 (NOF's Percumyl H) were mixed to prepare a curable resin composition of Example 1.

The structures of the polymerization initiators used here are shown below. The following photoradical polymerization initiator F-2 is BASF's Irgacure 907.

Photoradical Polymerization Initiators

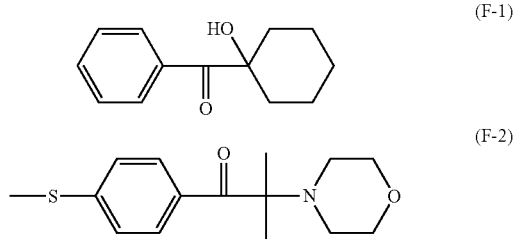

Thermal Radical Polymerization Initiators

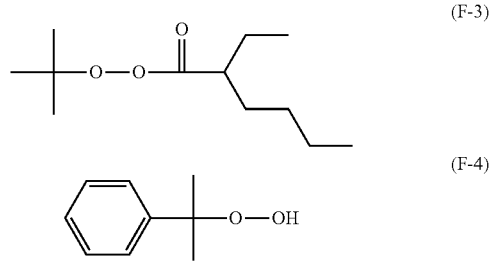

<Evaluation after Photopolymerization and/or Heating, and after Thermal Polymerization>
(Viscosity at 25° C. And 10 Hz after UV Irradiation and/or Heating)

The curable resin composition was cast into a die having a diameter of 20 mm and a thickness of 1 mm, and irradiated with UV rays at 15 mW/cm$^2$ for the period of time shown in the following Table, using Execure 3000 (by HOYA), thereby giving a semi-cured product (photo-cured product). In semi-curing by heating, the curable resin composition cast into the die having a diameter of 20 mm and a thickness of 1 mm was heated at 90° C. for the period of time shown in the following Table to give a semi-cured product.

Next, using HAAKE's RheoStress RS600, the dynamic complex viscosity at 25° C. and 10 Hz of the semi-cured product was measured.
(Evaluation of Mold Clearance Leakage of Resin (i))

A thermoforming mold for 4.0-mm lenses, comprising an upper die part (top die part), a body die part and a lower die part (bottom die part), was used here. The top die part was removed from the mold, and 10 mg of the curable resin composition was cast into the mold. Thus cast, the curable resin composition was irradiated with UV rays at 15 mW/cm$^2$ for the period of time shown in the following Table, using Execure 3000 (by HOYA), or heated for the period of time also shown in the following Table, thereby forming a semi-cured product having a controlled viscosity, on the thermoforming mold. Next, the semi-cured product was fixed with the top die part put thereon, and in that condition, the thermoforming mold with the semi-cured product held therein was heated at 80° C., and the further heated up to 200° C. while a pressure of 30 kgf/cm$^2$ was kept given to the semi-cured product, and thereafter cooled to room temperature.

In the process from casting the curable resin composition into the thermoforming mold to cooling it to room temperature, the weight of the resin having leaked through the thermoforming mold clearance (gap formed between the body die part and the upper and lower die parts) was measured, and based on the thus-measured weight, the resin composition was evaluated according to the following criteria.
A: The resin leakage was less than 0.1 mg.
B: The resin leakage was from 0.1 mg to less than 0.2 mg.
C: The resin leakage was 0.2 mg or more, and the level is problematic in practical use.

The obtained results are shown in the following Table.
(Evaluation of Mold Clearance Leakage of Resin (ii))

10 mg of the curable resin composition cast into a columnar transparent preform die having a diameter of 4 mm and a height of 1.5 mm was irradiated with UV rays at 15 mW/cm$^2$ for the period of time shown in the following Table, using Execure 3000 (by HOYA), or heated for the period of time also shown in the following Table, thereby forming a semi-cured product having a controlled viscosity. Next, the semi-cured product having the shape of the preform was transferred from the preform mold to the thermoforming mold used in the "evaluation of mold clearance leakage of resin (i)", using a vacuum tweezer system. After heated at 80° C., this was further heated up to 200° C. while a pressure of 30 kgf/cm$^2$ was kept give to the semi-cured product, and then cooled to room temperature.

In the process from transferring the semi-cured product to the thermoforming mold to cooling it to room temperature, the length of the burrs formed by leakage of the resin through the thermoforming mold clearance was measured, and based on the thus-measured length, the resin composition was evaluated according to the following criteria.
A: The resin leakage was less than 0.1 mg.
B: The resin leakage was from 0.1 mg to less than 0.2 mg.
C: The resin leakage was 0.2 mg or more, and the level is problematic in practical use.

The obtained results are shown in the following Table.
(Evaluation of Lens Moldability)

The same process as that for the "evaluation of mold clearance leakage of resin (ii)" was repeated 10 times, and the appearance of each lens thus produced was checked with Keyence's Digital Microscope (trade name: VHX-1000). Those with fine wrinkles on the surface of the flange part each lens, and those with cracks were considered as not good; and those with neither wrinkles not cracks were considered as good. Ten lenses were evaluated, and of those, the rate of good ones was referred to as a good rate. The resin composition was evaluated according to the following criteria.
A: The good rate was 90% or more.
B: The good rate was 80% or more.
C: The good rate was 30% or more
D: The good rate was less than 30%.
(Refractive Index, Abbe's Number)

The curable resin composition was cast into a transparent glass die having a diameter of 10 mm and a thickness of 1 mm, and irradiated with UV rays at 15 mW/cm$^2$ for the period of time shown in the following Table, using Execure 3000 (by HOYA), or heated for the period of time also shown in the following Table, thereby giving a semi-cured product.

Next, the semi-cured product was heated at 200° C. for 5 minutes, using a hot plate, thereby giving a thermally-cured product. The refractive index at 589 nm and the Abbe's number of the thus-obtained thermally-cured product were measured, using Abbe Meter (by Atago).

The obtained results are shown in the following Table.

(Water Absorption)

The curable resin composition was cast into a transparent glass die having a diameter of 10 mm and a thickness of 1 mm, and irradiated with UV rays at 15 mW/cm² for the period of time shown in the following Table, using Execure 3000 (by HOYA), or heated for the period of time also shown in the following Table, thereby giving a semi-cured product.

Next, the semi-cured product was heated at 200° C. for 5 minutes, using a hot plate, thereby giving a thermally-cured product, and the weight (Wi) thereof was measured. Subsequently, the thermally-cured product was kept in an environment tester set at 85° C. and a relative humidity of 85% for 3 weeks, and the weight (Wf) thereof was measured. The water absorption of the thus-obtained cured product was computed according to the following equation. The obtained results are shown in the following Table.

$$\text{Water Absorption (\%)} = \frac{W_f - W_i}{W_i} \times 100$$

(270° C. Storage Elastic Modulus)

The curable resin composition was cast into a die having a diameter of 20 mm and a thickness of 0.2 mm, and irradiated with UV rays at 15 mW/cm² for a predetermined period of time, using Execure 3000 (by HOYA), or heated for the period of time shown in the following Table, thereby giving a semi-cured product.

Next, the semi-cured product was heated at 200° C. for 5 minutes, using a hot plate, thereby giving a thermally-cured product. Thus obtained, the thermally-cured product was cut into rectangular strips each having a width of 5 mm, a length of 15 mm and a thickness of 0.2 mm. Next, using Rheogel-E4000 (UBM's dynamic viscoelastometer), the storage elastic modulus of the cured product was measured under the condition of a tensile mode, a frequency of 10 Hz and a strain of 10 μm (constant). This is the 270° C. storage elastic modulus of the cured product.

The obtained results are shown in the following Table.

Examples 2 to 25, Comparative Examples 1 to 5

Curable resin compositions were prepared, for which the materials used were changed as in the following Table 1 and Table 2, and semi-cured products and cured products of Examples and Comparative Examples were produced and evaluated. The obtained results are shown in the following Table 1 and Table 2. The non-conjugated vinylidene group-containing compounds B-2, B-3, B-5 and B-8, and the polyfunctional (meth)acrylate monomers Aa-2 and Aa-10 were obtained according to the following methods.

B-2: Tokyo Chemical Industry's trade name (+)-Limonene
B-3: Sigma Aldrich Japan's trade name (+)-Longifolene
B-5: Sigma Aldrich Japan's trade name (+)-Aromadendrene
B-8: Sigma Aldrich Japan's trade name (−)-Alloisolongifolene
Aa-2: Shin-Nakamura Chemical Industry's trade name DCP
Aa-10: Daicel-Cytec's PETIA (pentaerythritol triacrylate)

<Obtainment of Polymer Having Non-Conjugated Vinyl Group in Side Chain>

The polymers having a non-conjugated vinyl group in the side chain thereof, E-1, E-2 and E-3 used in Examples 12 to 20 and 25 were synthesized according to the following methods.

(Synthesis of E-1)

20.0 g of tricyclo[5,2,1,0$^{2,6}$]dec-8-yl acrylate (Hitachi Chemical Industry's trade name FA-513AS), 30.0 g of allyl methacrylate (by Wako Pure Chemical Industry), and 500.0 g of ethyl acetate were put into a 1-liter three-neck flask equipped with a reflux condenser and a gas-introducing cock, then purged twice with nitrogen, and 0.6 g of an initiator, Wako Pure Chemical Industry's V-65 (trade name) was added thereto, and further purged twice with nitrogen, and thereafter heated in a nitrogen stream atmosphere at 65° C. for 6 hours. Subsequently, the reaction liquid was poured into 2 L of methanol, and the precipitated white solid was collected through suction filtration. This was dried under reduced pressure at 70° C. for 5 hours to remove the solvent through distillation, thereby giving a polymer E-1 (yield 60%, number-average molecular weight 24,000, weight-average molecular weight 58,000).

(Synthesis of E-2)

50.0 g of 1,2-epoxy-4-vinylcyclohexane (Daicel Chemical Industry's Celloxide 2000), and 490.0 g of dewatered toluene were put into a 1-liter three-neck flask equipped with a gas-introducing cock, then fully purged with nitrogen, and thereafter the liquid temperature was controlled at −70° C., and a solution of 1.0 g of boron trifluoride diethyl ether complex and 9.0 g of dewatered toluene was dropwise added thereto and reacted, taking about 1 hour. After the addition, this was further reacted for 1 hour. Subsequently, the reaction liquid was poured into 2 L of methanol, and the precipitated white solid was collected through suction filtration. This was dried under reduced pressure at 60° C. for 5 hours to remove the solvent, thereby giving a polymer E-2 (yield 50%, number-average molecular weight 3,100, weight-average molecular weight 18,100).

(Synthesis of E-3)

50.0 g of allyl methacrylate (by Wako Pure Chemical Industry) and 500.0 g of ethyl acetate were put into a 1-liter three-neck flask equipped with a reflux condenser and a gas-introducing cock, then purged twice with nitrogen, and thereafter 0.6 g of an initiator, Wako Pure Chemical Industry's V-65 (trade name) was added thereto, then purged twice with nitrogen and heated in a nitrogen stream atmosphere at 65° C. for 6 hours. Subsequently, the reaction liquid was poured into 2 L of methanol, and the precipitated white solid was collected through suction filtration. This was dried under reduced pressure at 70° C. for 5 hours to remove the solvent through distillation, thereby giving a polymer E-3 (yield 60%, number-average molecular weight 34,000, weight-average molecular weight 85,000).

TABLE 1

| | Com. Ex. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| Polymer Having Non-Conjugated Vinyl Group in Side Chain — E-1 | 60 | 60 | 60 | 60 | 60 | 60 | 60 | 60 | 60 | 60 | 20 | 83 | |
| E-2 | | | | | | | | | | | | | |
| E-3 | | | | | | | | | | | | | 25 |
| Polyfunctional (Meth)acrylic Monomer — Aa-1 | 30 | 30 | 30 | 30 | 30 | 30 | 30 | 30 | 30 | 20 | 70 | 7 | 45 |
| Aa-2 | | | | | | | | | | | | | |
| Aa-10 | | | | | | | | | | | | | |
| Monofunctional (Meth)acrylic Monomer — Ab-1 | 10 | 10 | 10 | 10 | 10 | | | | | 20 | 10 | 10 | 20 |
| Non-Conjugated Vinylidene Group-Containing Compound (satisfying general formula (2) and having alkenyl group) — B-1 | | | | | | 10 | | | | | | | 10 |
| B-2 | | | | | | | | | | | | | |
| Non-Conjugated Vinylidene Group-Containing Compound (satisfying general formula (2) but not having alkenyl group) — B-3 | | | | | | | 10 | | | | | | |
| B-5 | | | | | | | | 10 | | | | | |
| Non-Conjugated Vinylidene Group-Containing Compound (not satisfying general formula (2) and not having alkenyl group) — B-8 | | | | | | | | | 10 | | | | |
| Photoradical Initiator — F-1 (Irgacure 184) | 0.1 | 0.1 | 0.1 | 0.1 | 0.1 | 0.1 | 0.1 | 0.1 | 0.1 | 0.1 | 0.1 | 0.1 | 0.1 |
| F-2 (Irgacure 907) | 1 | 1 | 1 | 1 | 1 | 1 | 1 | 1 | 1 | 1 | 1 | 1 | 1 |
| Thermal Radical Initiator — F-3 (Perbutyl O) | 0.5 | 0.5 | 0.5 | 0.5 | 0.5 | 0.5 | 0.5 | 0.5 | 0.5 | 0.5 | 0.5 | 0.5 | 0.5 |
| F-4 (Percumyl H) | | | | | | | | | | | | | |
| Photopolymerization Condition — UV irradiation time (sec) | 8 | 15 | 20 | 30 | 50 | 20 | 20 | 20 | 20 | 25 | 40 | 15 | 20 |
| Heating (Semi-curing) Condition — 90° C. Heating time (sec) | — | — | — | — | — | — | — | — | — | — | — | — | — |
| Characteristics of Semi-Cured Product — Viscosity at 25° C. and 10 Hz after UV irradiation and/or heating (mPa·s) | $8.1 \times 10^{4}$ | $9.0 \times 10^{5}$ | $1.4 \times 10^{6}$ | $5.2 \times 10^{6}$ | $9.0 \times 10^{7}$ | $1.5 \times 10^{6}$ | $1.3 \times 10^{6}$ | $1.7 \times 10^{6}$ | $1.2 \times 10^{6}$ | $1.5 \times 10^{6}$ | $1.5 \times 10^{6}$ | $1.2 \times 10^{6}$ | $1.5 \times 10^{6}$ |
| Mold clearance leakage of resin (i) | C | C | C | C | C | C | C | C | C | C | C | C | A |
| Mold clearance leakage of resin (ii) | C | B | A | A | A | A | A | A | A | A | A | A | A |
| Characteristics of Cured Product — Evaluation of lens moldability | D | A | A | A | B | A | A | A | A | A | A | B | A |
| Refractive index | 1.52 | 1.52 | 1.52 | 1.52 | 1.52 | 1.52 | 1.52 | 1.52 | 1.52 | 1.51 | 1.52 | 1.52 | 1.52 |
| Abbe's number | 54 | 55 | 55 | 55 | 55 | 55 | 55 | 55 | 55 | 54 | 56 | 56 | 55 |
| Water absorption (%) | 0.8 | 0.8 | 0.8 | 0.8 | 0.8 | 0.8 | 0.8 | 0.8 | 0.8 | 0.6 | 0.4 | 1.2 | 0.7 |
| 270° C. Storage elastic modulus ($\times 10^{2}$ MPa) | 1.7 | 1.7 | 1.7 | 1.7 | 1.7 | 1.6 | 1.1 | 1.2 | 0.9 | 1.5 | 0.3 | 3.8 | 1.9 |

TABLE 2

| | | Ex. 13 | Ex. 14 | Ex. 15 | Ex. 16 | Ex. 17 | Ex. 18 | Ex. 19 | Ex. 20 | Ex. 21 | Ex. 22 | Com. Ex. 2 | Com. Ex. 3 | Com. Ex. 4 | Ex. 23 | Ex. 24 | Ex. 25 | Com. Ex. 5 |
|---|---|---|---|---|---|---|---|---|---|---|---|---|---|---|---|---|---|---|
| Polymer Having Non-Conjugated Vinyl Group in Side Chain | E-1 | 25 | 25 | 25 | 25 | | | | | | | | | | | | 25 | |
| | E-2 | | | | | 25 | | 3 | 40 | | | | | | | | | |
| | E-3 | | | | | | 25 | | | | | | | | | | | |
| Polyfunctional (Meth)acrylic Monomer | Aa-1 | 45 | 45 | 45 | 45 | 45 | 45 | 61 | 36 | 59.8 | 41.4 | 60 | 60 | | 60 | 60 | 45 | 60 |
| | Aa-2 | | | | | | | | | | | | | 65 | | | | |
| | Aa-10 | | | | | | | | | | | | | 35 | | | | |
| Monofunctional (Meth)acrylic Monomer | Ab-1 | 20 | 20 | 20 | 20 | 20 | 20 | 27 | 18 | 39.8 | 27.6 | 30 | 40 | | 30 | 30 | 20 | 40 |
| Non-Conjugated Vinylidene Group-Containing Compound (satisfying general formula (2) and having alkenyl group) | B-1 | 10 | | | | | 10 | 9 | 6 | 0.4 | 31 | 10 | | | 10 | 10 | 10 | |
| | B-2 | | | | | 10 | | | | | | | | | | | | |
| Non-Conjugated Vinylidene Group-Containing Compound (satisfying general formula (2) but not having alkenyl group) | B-3 | | 10 | | | | | | | | | | | | | | | |
| | B-5 | | | 10 | | | | | | | | | | | | | | |
| Non-Conjugated Vinylidene Group-Containing Compound (not satisfying general formula (2) and not having alkenyl group) | B-8 | | | | 10 | | | | | | | | | | | | | |
| Photoradical Initiator | F-1 (Irgacure 184) | 0.1 | 0.1 | 0.1 | 0.1 | 0.1 | 0.1 | 0.1 | 0.1 | 0.1 | 0.1 | 0.1 | 0.1 | | 0.1 | | | |
| | F-2 (Irgacure 907) | | | | | | | | | | | | | | | | | |
| Thermal Radical Initiator | F-3 (Perbutyl O) | 1 | 1 | 1 | 1 | 1 | 1 | 1 | 1 | 1 | 1 | 1 | 1 | 3 | 1.5 | 1 | 1 | 1 |
| | F-4 (Percumyl H) | 0.5 | 0.5 | 0.5 | 0.5 | 0.5 | 0.5 | 0.5 | 0.5 | 0.5 | 0.5 | 0.5 | 0.5 | 2 | | 0.5 | 0.5 | 0.5 |
| Photopolymerization Condition | UV irradiation time (sec) | 20 | 20 | 20 | 20 | 20 | 20 | 20 | 15 | 20 | 40 | 60 | 17 | 6 | 15 | — | — | — |
| Heating (Semi-curing) Condition | 90° C. Heating time (sec) | — | — | — | — | — | — | — | — | — | — | — | — | — | — | 20 | 20 | 20 |
| Characteristics of Semi-Cured Product | Viscosity at 25° C. and 10 Hz after UV irradiation and/or heating (mPa·s) | 1.5 × 10⁶ | 1.5 × 10⁶ | 1.5 × 10⁶ | 1.5 × 10⁶ | 1.2 × 10⁶ | 1.8 × 10⁶ | 1.5 × 10⁶ | 1.6 × 10⁶ | 5.3 × 10⁶ | 2.5 × 10⁶ | >10⁸ | 2.3 × 10⁷ | 2.1 × 10⁷ | 2.5 × 10⁷ | 8.0 × 10⁷ | 5.5 × 10⁷ | >10⁸ |
| | Mold clearance leakage of resin (i) | A | A | A | A | A | A | B | A | C | C | C | C | C | C | C | A | C |

TABLE 2-continued

| | | Ex. 13 | Ex. 14 | Ex. 15 | Ex. 16 | Ex. 17 | Ex. 18 | Ex. 19 | Ex. 20 | Ex. 21 | Ex. 22 | Com. Ex. 2 | Com. Ex. 3 | Com. Ex. 4 | Ex. 23 | Ex. 24 | Ex. 25 | Com. Ex. 5 |
|---|---|---|---|---|---|---|---|---|---|---|---|---|---|---|---|---|---|---|
| Characteristics of Cured Product | Mold clearance leakage of resin (ii) | A | A | A | A | A | A | A | A | A | A | A | A | A | A | A | A | A |
| | Evaluation of lens moldability (appearance evaluation) | A | A | A | A | A | A | A | A | C | A | D | D | D | C | B | B | D |
| | Refractive index | 1.52 | 1.52 | 1.52 | 1.52 | 1.52 | 1.52 | 1.52 | 1.52 | 1.52 | 1.51 | 1.52 | 1.52 | 1.52 | 1.52 | 1.52 | 1.52 | 1.52 |
| | Abbe's number | 55 | 55 | 55 | 55 | 55 | 55 | 55 | 52 | 56 | 51 | 55 | 56 | 55 | 55 | 55 | 55 | 56 |
| | Water absorption (%) | 0.7 | 0.7 | 0.7 | 0.7 | 0.6 | 0.8 | 0.8 | 0.7 | 1.0 | 0.5 | 0.8 | 0.9 | 1.3 | 0.8 | 0.8 | 0.7 | 0.9 |
| | 270° C. Storage elastic modulus (×$10^2$ MPa) | 1.8 | 1.2 | 1.2 | 0.9 | 1.7 | 2.1 | 1.9 | 2.3 | 1.8 | 0.9 | 1.7 | 1.8 | 3.2 | 1.7 | 1.7 | 1.9 | 1.8 |

From Table 1 and Table 2, it is known that, of the semi-cured product obtained according to the production method of the invention, the complex viscosity is controlled to fall within the range as defined in the production method of the invention, and the cured product of the invention obtained from the semi-cured product through the subsequent thermal polymerization step does not generate burrs during molding thereof, or that is, the good rate in molding the product is high, and the heat resistance at 270° C. of the product is high.

On the other hand, from Comparative Example 1, it is known that, when the complex viscosity of the semi-cured product is lower than the lower limit defined in the invention and when the semi-cured product is polymerized in the subsequent thermal polymerization step, then the cured product generates significant burrs during molding thereof, and the good rate in molding the product is low. From Comparative Example 2, it is known that, when the complex viscosity of the semi-cured product is more than the upper limit defined in the invention and when the semi-cured product is polymerized in the subsequent thermal polymerization step, then the good rate in molding the product is low. From Comparative Examples 3 and 4, it is known that, when the complex viscosity of the semi-cured product is controlled to fall within the range defined in the invention with no addition of a non-conjugated vinylidene group-containing compound to the resin composition and when the semi-cured product is polymerized in the subsequent thermal polymerization step, then the good rate in molding the product is low.

Examples are compared with each other. When Examples 8 and 16 are compared with the other Examples, it is known that use of the curable resin composition to which a compound satisfying the general formula (2) is added as the non-conjugated vinylidene group-containing compound improves more the heat resistance of the thermally-cured product (or that is, the Young's modulus at 270° C. of the cured product is high). From Examples 21 and 22, it is known that, when the amount of the non-conjugated vinylidene group-containing compound added to the curable resin composition is lower than the preferred range of from 0.5 to 30% by mass (or that is, when the amount is 0.3% by mass), then the lens moldability evaluation is on the level of "B", but when higher (31% by mass), then the 270° C. storage elastic modulus lowers.

From Example 10, it is known that when the amount of the polyfunctional (meth)acrylate relative to the total amount of the polyfunctional (meth)acrylate and the monofunctional (meth)acrylate in the resin composition is lower than the preferred range of from 30 to 90% by mass (or that is, when the amount is 22% by mass), then the 270° C. storage elastic modulus lowers. From Example 11, it is known that when the amount of the polyfunctional (meth)acrylate relative to the total amount of the polyfunctional (meth)acrylate and the monofunctional (meth)acrylate in the resin composition is more than the preferred range of from 30 to 90% by mass (or that is, when the amount is 92% by mass), then the water absorption increases.

Examples 12 to 16, 19, 20 and 25 are compared with the other Examples. It is known that, when the curable resin composition of the invention to which a polymer having a non-conjugated vinyl group in the side chain thereof is used and when the amount of the polymer having a non-conjugated vinyl group in the side chain thereof in the curable resin composition is 3% by mass, then the resin leakage through the mold clearance in injection of the composition into a thermoforming mold can be prevented in some degree, and when the amount is increased to 25% by mass or to 40% by mass, then the resin leakage through the mold clearance (i) can be more effectively inhibited. When the amount of the polymer having a non-conjugated vinyl group in the side chain thereof in the curable resin composition is 51% by mass or more, then the initial viscosity of the composition is too high and it would be often difficult to dispense the composition.

Example 23 is compared with the other Examples. It is known that when the thermal radical polymerization initiator contains a hydroperoxide-type radical polymerization initiator, then the good rate in lens formation is high.

Example 24 is compared with the other Examples. It is known that even when the semi-cured product is obtained by heating, the product generates few burrs in molding thereof, or that is, the good rate in molding the product is high, and the heat resistance at 270° C. of the product is high.

Example 25 is compared with the other Examples. It is known that even when the semi-cured product is obtained by heating, the product generates few burrs in molding thereof, or that is, the good rate in molding the product is high, and the heat resistance at 270° C. of the product is high, and further, when the curable resin composition is directly cast into the thermoforming mold, the resin leakage through the mold clearance (i) can be inhibited.

(Light Transmittance)

The cured product of each Example, produced in the same manner as that for the evaluation of 270° C. storage elastic modulus, was analyzed for the light transmittance thereof according to the method described herein. As a result, every cured product had a light transmittance of 95% or more.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2011/074421, filed Oct. 24, 2011; Japanese Application No. 2010-238454, filed Oct. 25, 2010; and Japanese Application No. 2011-125542, filed Jun. 3, 2011, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A curable resin composition containing a (meth)acrylate monomer, a non-conjugated vinylidene group-containing compound represented by the following general formula (2), and a thermal radical-polymerization initiator having a hydroperoxide group in the molecule, wherein the non-conjugated vinylidene group-containing compound does not contain a (meth)acrylate monomer:

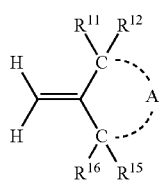

General Formula (2)

wherein, in the general formula (2), $R^{11}$, $R^{12}$, $R^{15}$ and $R^{16}$ each independently represent a substituent, A represents an atomic group necessary for forming a cyclic structure.

2. The curable resin composition according to claim 1, which further contains a photoradical polymerization initiator.

3. A curable resin composition containing a (meth)acrylate monomer, a non-conjugated vinylidene group-containing compound represented by the following general formula (1), a polymer having a non-conjugated vinyl group in the side chain thereof, and at least one of a thermal radical-polymerization initiator and a photoradical polymerization initiator, wherein the non-conjugated vinylidene group-containing compound does not contain a (meth)acrylate monomer:

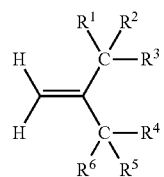

General Formula (1)

wherein, in the general formula (1), $R^1$ to $R^6$ each independently represent a substituent, at least one of $R^1$ to $R^6$ forms a ring, or at least two bond to each other to form a ring.

4. The curable resin composition according to claim 3, which contains a thermal radical-polymerization initiator and a photoradical polymerization initiator, and wherein the non-conjugated vinylidene group-containing compound does not contain a (meth)acrylate monomer.

5. The curable resin composition according to claim 1, further comprising a polymer having a non-conjugated vinyl group in the side chain thereof.

6. The curable resin composition according to claim 1, further comprising a thermal radical polymerization initiator not having a hydroperoxide group in the molecule.

7. The curable resin composition according to claim 3, further comprising a thermal radical polymerization initiator not having a hydroperoxide group in the molecule.

8. The curable resin composition according to claim 3, wherein the polymer having a non-conjugated vinyl group in the side chain thereof is selected from the group consisting of the following formulae (E-1) to (E-6):

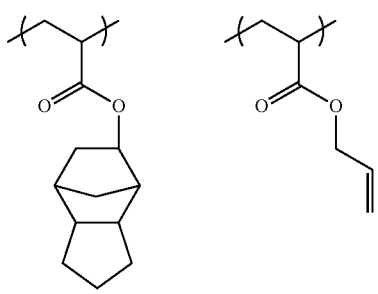

(E-1)

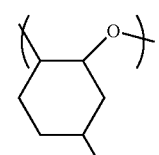

(E-2)

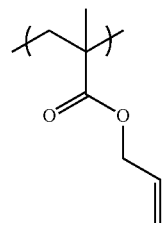

(E-3)

(E-4)

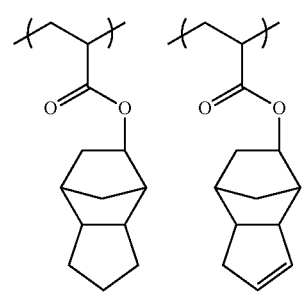

(E-5)

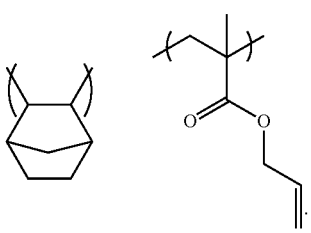

(E-6)

9. The curable resin composition according to claim 3, wherein any two of $R^1$ to $R^3$ or any two of $R^4$ to $R^6$ bond to each other to form a ring.

* * * * *